(12) United States Patent
Passarella et al.

(10) Patent No.: US 9,059,841 B2
(45) Date of Patent: Jun. 16, 2015

(54) AUTO-DISCOVERY OF A NON-ADVERTISED PUBLIC NETWORK ADDRESS

(75) Inventors: Rossano Passarella, Mukilteo, WA (US); William M. Stevens, Oroville, WA (US); Jayesh Sukumaran, Woodinville, WA (US); Donald P. Wahlstrom, Woodinville, WA (US); Yan Zhang, Bellevue, WA (US)

(73) Assignee: Broadcom Corporation, Irvine, CA (US)

( * ) Notice: Subject to any disclaimer, the term of this patent is extended or adjusted under 35 U.S.C. 154(b) by 849 days.

(21) Appl. No.: 11/638,079

(22) Filed: Dec. 13, 2006

(65) Prior Publication Data

US 2007/0183382 A1 Aug. 9, 2007

Related U.S. Application Data

(63) Continuation of application No. 11/516,470, filed on Sep. 5, 2006.

(60) Provisional application No. 60/765,259, filed on Feb. 3, 2006.

(51) Int. Cl.
| | |
|---|---|
| *H04W 84/12* | (2009.01) |
| *H04L 9/08* | (2006.01) |
| *H04L 29/12* | (2006.01) |
| *H04L 29/06* | (2006.01) |

(Continued)

(52) U.S. Cl.
CPC .......... *H04L 9/0844* (2013.01); *H04L 61/2015* (2013.01); *H04L 63/0428* (2013.01); *H04L 63/062* (2013.01); *H04L 63/0853* (2013.01); *H04L 63/0869* (2013.01); *H04W 8/26* (2013.01); *H04W 12/02* (2013.01); *H04W 12/06* (2013.01); *H04W 60/00* (2013.01); *H04W 88/08* (2013.01); *H04W 88/12* (2013.01); *H04W 92/12* (2013.01); *H04L 2209/80* (2013.01)

(58) Field of Classification Search
CPC ............ H04L 2209/80; H04L 61/2015; H04L 63/0428; H04L 63/062; H04L 63/0853; H04L 63/0869; H04L 9/0844; H04W 12/02; H04W 12/06; H04W 60/00; H04W 88/08; H04W 88/12; H04W 8/26; H04W 92/12
USPC .............. 455/410–411, 432.1–453, 509, 424; 370/331, 508; 709/225, 227–229; 713/153, 155; 726/2–6, 12, 27–30; 380/247
See application file for complete search history.

(56) References Cited

U.S. PATENT DOCUMENTS

| | | | |
|---|---|---|---|
| 5,729,537 A | 3/1998 | Billstrom | |
| 7,263,076 B1 * | 8/2007 | Leibovitz et al. | ............. 370/310 |

(Continued)

OTHER PUBLICATIONS

International Search Report directed to related International Patent Application No. PCT/US2006/47724, mailed Sep. 17, 2008; 3 pages.

*Primary Examiner* — Babar Sarwar
(74) *Attorney, Agent, or Firm* — Sterne, Kessler, Goldstein & Fox P.L.L.C.

(57) ABSTRACT

Providing a network address is disclosed. A communication indicating that a first node desires to communicate via a packet data network with a second node configured to provide access to a private resource is received. A non-publicly advertised packet data network address usable to communicate with the second node via the packet data network is provided to the first node.

25 Claims, 6 Drawing Sheets

(51) Int. Cl.
*H04W 8/26* (2009.01)
*H04W 12/02* (2009.01)
*H04W 12/06* (2009.01)
H04W 60/00 (2009.01)
H04W 88/08 (2009.01)
H04W 88/12 (2009.01)
H04W 92/12 (2009.01)

(56) References Cited

U.S. PATENT DOCUMENTS

| | | | |
|---|---|---|---|
| 7,831,237 | B2 | 11/2010 | Passarella et al. |
| 2002/0012433 | A1* | 1/2002 | Haverinen et al. ............ 380/247 |
| 2003/0058818 | A1* | 3/2003 | Wilkes et al. ................. 370/331 |
| 2004/0192211 | A1* | 9/2004 | Gallagher et al. ......... 455/67.11 |
| 2004/0224667 | A1 | 11/2004 | Jain et al. |
| 2005/0079869 | A1* | 4/2005 | Khalil et al. ............... 455/435.1 |
| 2005/0101295 | A1 | 5/2005 | Rupp et al. |
| 2005/0124345 | A1 | 6/2005 | Laroia et al. |
| 2005/0130654 | A1 | 6/2005 | Di Claudio et al. |
| 2006/0009247 | A1 | 1/2006 | Kelley et al. |
| 2006/0079205 | A1 | 4/2006 | Semple et al. |
| 2007/0173229 | A1 | 7/2007 | Dong et al. |
| 2008/0081592 | A1 | 4/2008 | Das et al. |
| 2008/0104399 | A1* | 5/2008 | Fascenda ...................... 713/168 |
| 2008/0119187 | A1* | 5/2008 | Gallagher et al. ............ 455/436 |
| 2008/0160959 | A1 | 7/2008 | Huang et al. |
| 2008/0293377 | A1 | 11/2008 | Pauliac |
| 2009/0239502 | A1 | 9/2009 | Dempo et al. |
| 2009/0253411 | A1 | 10/2009 | Arkko et al. |
| 2010/0009659 | A1 | 1/2010 | Netanel et al. |

* cited by examiner

AUTO-DISCOVERY OF A NON-ADVERTISED PUBLIC NETWORK ADDRESS

CROSS REFERENCE TO OTHER APPLICATIONS

This application is a continuation of co-pending U.S. patent application Ser. No. 11/516,470, entitled AUTHENTICATING MOBILE NETWORK PROVIDER EQUIPMENT filed Sep. 5, 2006, which is incorporated herein by reference for all purposes, and which claims priority to U.S. Provisional Patent Application No. 60/765,259 entitled AUTHENTICATING MOBILE NETWORK PROVIDER EQUIPMENT filed Feb. 3, 2006, which is incorporated herein by reference for all purposes.

BACKGROUND OF THE INVENTION

Traditionally mobile network base transceiver stations (BTS) have exchanged data with the core mobile network via a dedicated, high capacity connection to an associated base station controller (BSC), e.g., a dedicated T-1/E-1 line. In some cases, it may be desirable to use an IP or other packet data network to enable a BTS to exchange data with a BSC. However, care must be taken to protect from abuse or attack, such as denial of service (DoS) attack, critical mobile network elements to which an authorized BTS may be configured and/or required to communicate via a packet data network. In addition, there is a need for a way to enable a BTS to find quickly the packet data network address and/or other information required to connect to the core mobile network via a packet data network, without requiring that each such BTS be separately provisioned with such information and without exposing such information to the general public and/or in a manner that could lead to abuse or attack.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Auto-discovery of a network address is disclosed. In some embodiments, a first mobile network equipment, such as a BTS, is configured to connect to the mobile network by communicating via a packet data network with an access node, such as a gateway. In some embodiments, the BTS is configured to register with a registration server (RS) at a public (e.g., IP) address associated with the RS and subsequently to access the core mobile network via an aggregation gateway (AGW) at a non-publicly advertised address associated with the AGW. The disclosed approach makes it significantly more difficult to mount a denial of service attack on the AGW. In addition, configuring the BTS to register with the RS and obtain from the RS an IP address for an AGW to service the BTS eliminates the need to separately provision each BTS with information regarding its servicing AGW and/or configuring the BTS to resolve a URL or other name to obtain an IP (or other packet data network) address for the servicing AGW.

Figure 1:
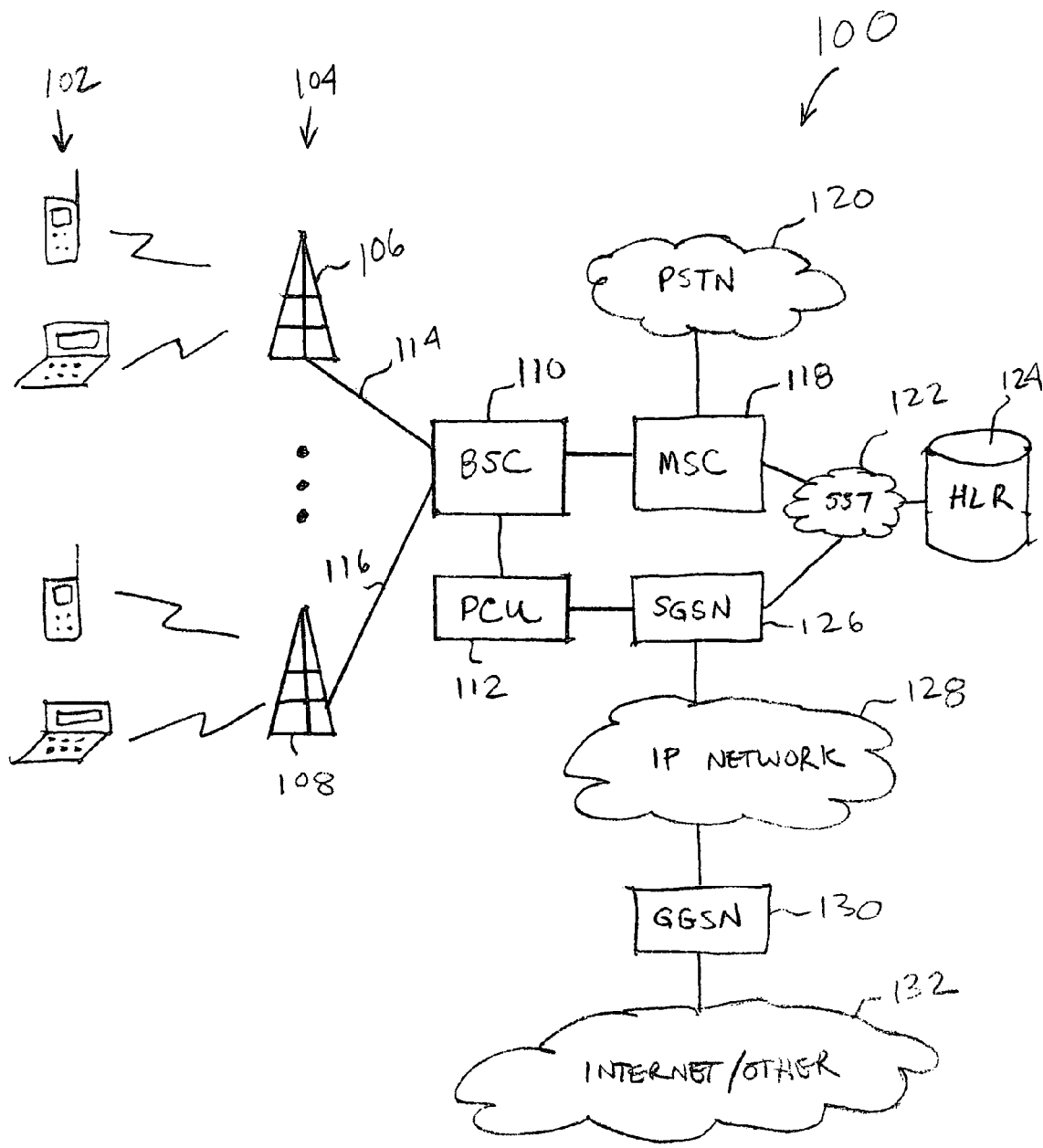
FIG. 1 is a block diagram illustrating elements of a typical GSM network.

FIG. 1 is a block diagram illustrating elements of a typical GSM network. In the example shown, GSM network 100 includes a plurality of mobile devices 102 connected via base transceiver stations 104, represented in FIG. 1 by BTS 106 and BTS 108, to a base station controller (BSC) 110. Mobile devices 102 are mobile network user equipments and are not mobile network provider equipments. The BSC 110 has a packet control unit 112 associated with it, for handling non-voice network data communication (e.g., GPRS) packets. The BTS's are connected to the BSC via Abis links 114 and 116, respectively. The Abis interface is a standards-based interface that typically includes one or more elements and/or requirements that are specific and typically proprietary to an original equipment manufacturer (OEM) and/or other vendor of the BSC. Typically, the Abis interface/link is carried over a dedicated and private T-1/E-1 line. In the example shown, the BSC 110 is connected to a mobile switching center 118, to which the BSC 110 is configured to route inbound voice data received from mobile equipment via a BTS and from which the BSC 110 is configured to receive outbound voice data. The MSC 118 connects to traditional telephone equipment and other networks via the public switched telephone network (PSTN) 120. The MSC 118 is connected via an SS7 (or other) network 122 to a home location register (HLR) 124 used to store subscriber data. To handle non-voice packet (e.g., GPRS) data, the PCU 112 is connected to an SGSN 126. In the example shown SGSN 126 is connected via SS7 network 122 to HLR 124. SGSN 126 is also connected via an IP network 128 and a GGSN 130 to the Internet (or other external packet data network) 132.

Figure 2:
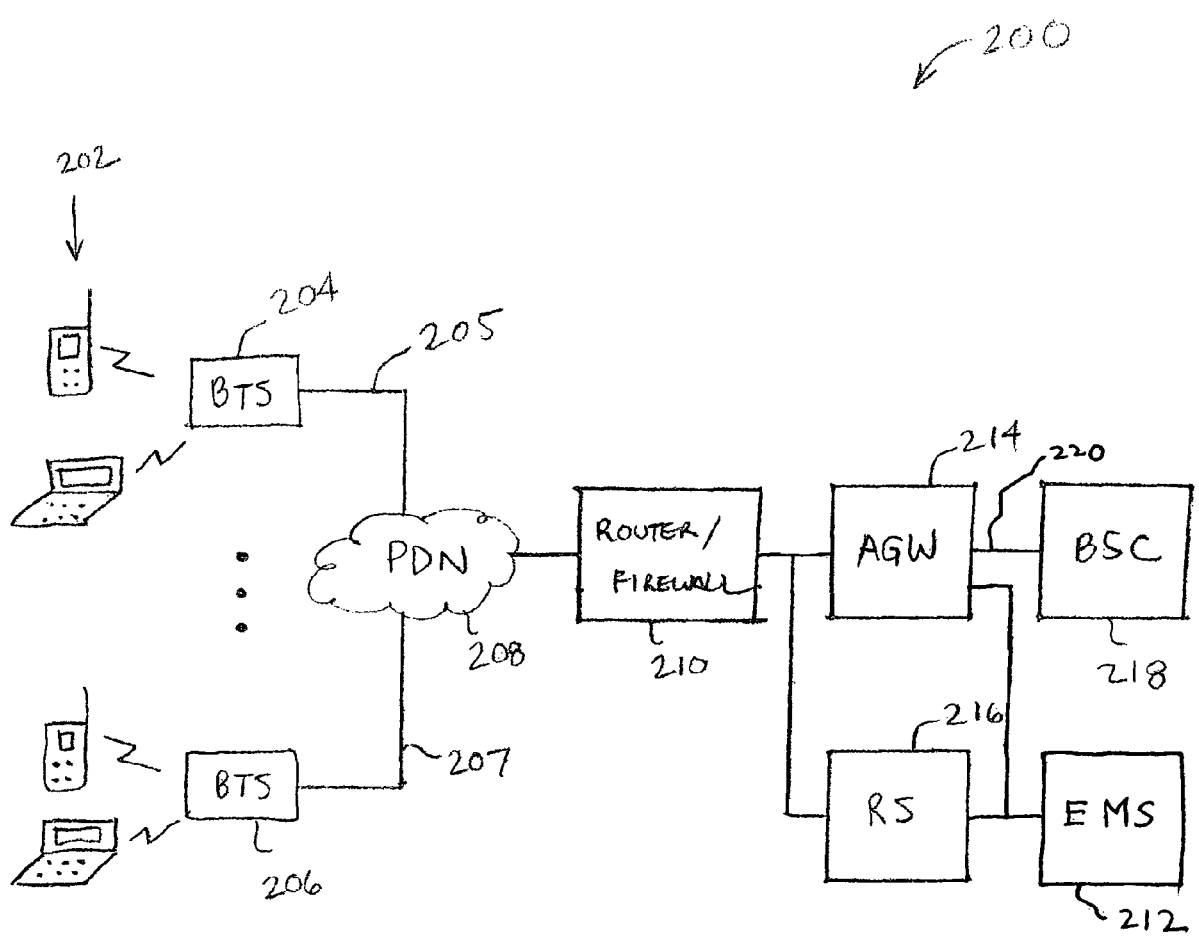
FIG. 2 is a block diagram illustrating an embodiment of a mobile network with packet data network backhaul.

FIG. 2 is a block diagram illustrating an embodiment of a mobile network with packet data network backhaul. In the example shown, the mobile network 200 includes mobile equipment 202 connected to a plurality of base transceiver stations represented in FIG. 2 by BTS 204 and BTS 206. BTS 204 and BTS 206 are connected via a local Internet access connection 205 and 207, respectively, to a packet data network (PDN) 208, such as the Internet. In some embodiments, mobile network data is sent, via PDN 208, between the base transceiver stations represented by BTS 204 and BTS 206, on the one hand, and AGW 214, on the other, using the Internet (IP) protocol. In various embodiments, Internet access connections 205 and 207 comprise a cable, DSL, or other modem collocated with the BTS and/or a local exchange carrier central office (LEC-CO) with DSLAM or cable head-end. Also connected to PDN 208 in the example shown in FIG. 2 is a router/firewall 210 connected to and configured to provide connectivity to and security with respect to an aggregation gateway 214, and a registration server 216. In some embodiments, element management server EMS 212 is connected to router/firewall 210. In some embodiments, router/firewall 210 is omitted and/or does not include a firewall. In various embodiments, element management server 212, an aggregation gateway 214, and a registration server 216 are included in one or more physical computing systems. Element management server 212 enables an administrator to perform operational, administrative, and/or management (OAM) operations with respect to one or more mobile network elements, e.g., BTS 204 or BTS 206. Aggregation gateway (AGW) 214 receives inbound mobile network data (voice, signaling, data, control/management) from one or more base transceiver stations (BTS), via PDN 208, aggregates data from two or more base transceiver stations (if/as applicable), and provides the inbound data to BSC 218 via one or more physical ports, using time division multiplex (TDM) as prescribed by the GSM standard and the BSC OEM's proprietary implementation of the Abis interface 220. In some embodiments, the AGW 214 is capable of interfacing with more than one type of BSC, e.g., with BSC's from two or more vendors. In some such embodiments, the AGW 214 is configured and/or provisioned, e.g., at deployment time, to use the Abis interface API of the particular type of BSC with which it is required to communicate in a particular installation. In some embodiments, an API or other interface specification or definition of the Abis interface as implemented by each BSC vendor/OEM the AGW is desired to be able to support is obtained and used as applicable to configure/provision the AGW to communicate with a particular BSC with which it is required to communicate. In some embodiments, BSC 218 is connected to a PCU, such as PCU 112 of FIG. 1. In some embodiments, AGW 214 is connected to a PCU. For example, BSC 218 is optional, and AGW 214 directly connected to a PCU.

In some embodiments, AGW 214 is configured to present two or more physical base transceiver stations to the BSC as a single logical BTS, to more efficiently use BSC resources in situations in which each BTS serves a relatively small service area and/or number of users. In some embodiments, AGW 214 is configured to map communications received from the BSC to the correct physical BTS and conversely to map communications received from two or more physical base transceiver stations to a single logical BTS prior to forwarding such inbound communications to the BSC.

Registration server 216 is configured to be used to register a BTS and/or other provider equipment with the network, e.g., to authenticate the equipment prior to providing to the equipment one or more session keys to be used in secure communication protocols, identifying (e.g., address) information for other network elements, such as AGW 214, etc.

Each BTS in the mobile network 200 shown in FIG. 2 in some embodiments handles only a small fraction of the call volume/load of a conventional BTS, and in such embodiments AGW 214 promotes more efficient use of limited BSC resources. For example, in some embodiments AGW 214 aggregates data associated with multiple base transceiver stations and provides communication to/from the BSC via a fewer number of physical BSC ports (e.g., a single port). In various embodiments, use of PDN 208 and AGW 214 to transport data between base transceiver stations such as BTS 204 and BTS 206, on the one hand, and BSC 218, on the other, makes it commercially feasible to provide a small form factor and/or relatively low capacity BTS for use in remote (e.g., rural) service areas and/or to provide dedicated service to individuals and/or relatively small groups of users, such as a household or small business, since in addition to not requiring a BSC port for each BTS a dedicated T-1/E-1 line is not required.

While the example shown in FIG. 2 and in other embodiments described herein involves a GSM network and/or uses GSM nomenclature to refer to network elements, the techniques described herein are applied in other embodiments to other types of mobile telecommunications networks, and in particular may be applied wherever a plurality of relatively low capacity base transceiver stations need to exchange mobile communication data with a base station controller or other node having a limited number of relatively very high capacity ports or other resources.

Figure 3:
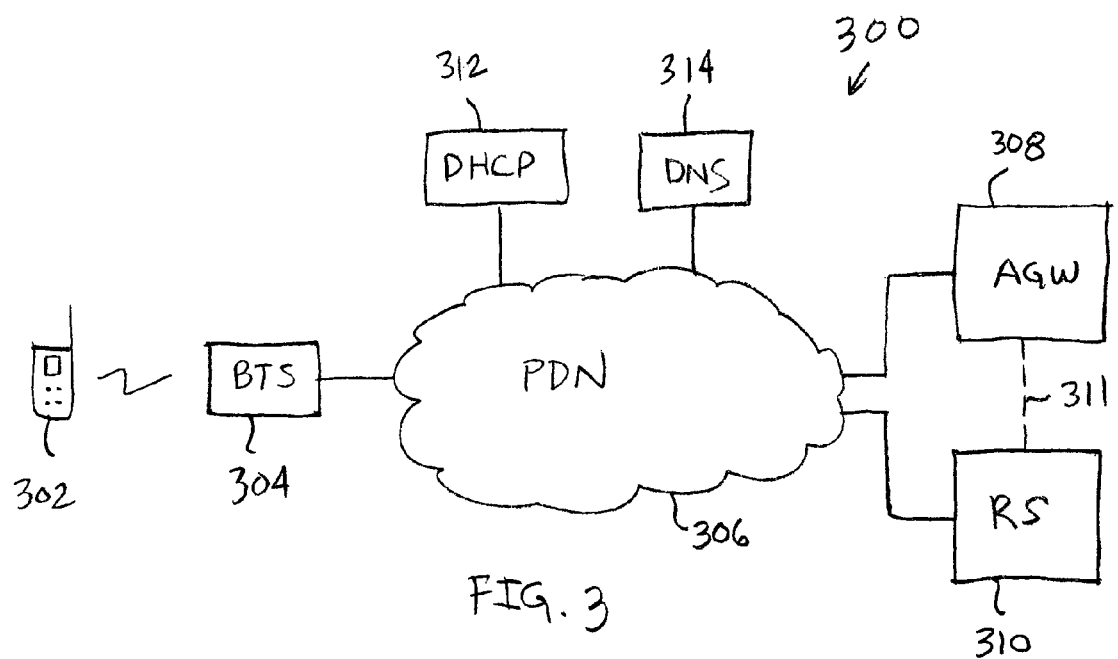
FIG. 3 is a block diagram illustrating an embodiment of a system 300 for authenticating mobile network provider equipment.

FIG. 3 is a block diagram illustrating an embodiment of a system 300 for authenticating mobile network provider equipment. In the example shown, a mobile device 302 connects via an air link to a base transceiver station (BTS) 304. BTS 304 communicates with an associated base station controller (not shown) over a packet data network 306 via an aggregation gateway 308, as in FIG. 2. Also shown in FIG. 3 are a DHCP server 312 used by the BTS 304 to obtain an IP address for use on packet data network 306 and a domain name service (DNS) 314 used by the BTS 304 to resolve URL's into IP addresses. In some embodiments, BTS 304 is configured to register via packet data network 306 with a registration server 310 to obtain access to AGW 308, e.g., by obtaining from the registration server 310 an IP address for AGW 308 known only by registered devices. In some embodiments, BTS 304 is configured and/or provisioned with a URL of the registration server 310, e.g., http://registrationserver.mobileprovider.com, and uses the URL to send a domain name query to DNS 314 to obtain an IP address for the registration server 310. Communication is established by BTS 304 with registration server 310, e.g., and SSL or other privacy protected or otherwise secure connection, and in some embodiments the BTS 304 and RS 310 mutually authenticate, e.g., as described below in connection with FIGS. 5 and 6. In the example shown, registration server 310 and AGW 308 are connected via a secure private connection 311 that enables them to exchange data in a reliable and trusted way. In some embodiments AGW 308 and RS 310 are included in the same physical computing system and connection 311 is a secure internal connection.

In some embodiments, BTS 304 includes an "equipment identity module" similar to a "subscriber identity module" (SIM), which is a specially-programmed "smart card" with a standards-based small form factor, used in GSM mobile networks to securely store and provision a mobile equipment such as a phone. In GSM phones, for example, a SIM includes a secret (e.g., key) stored in the SIM at its manufacture in a manner that cannot be read out from the SIM or otherwise discovered (e.g., by physically disassembling the SIM) once the manufacturing process has been completed, because attempts to access the secret destroy the SIM and the secret it embodies. When a GSM phone enters a new service area, the SIM data is used to authenticate the phone to the network, identifying the subscriber to the network. In some embodiments, BTS 304 includes and/or is configured and/or provisioned by installing an EIM (or other smart card or other device embodying and/or storing a key or other secret that the EIM cannot be made to provide as output and which is configured to use the secret to perform a cryptographic function). The secret and its association with the EIM (e.g., by serial or other identifying number and/or name) are recorded at the time the EIM is manufactured, so that the secret embodied in and/or stored on the EIM is shared in a secure way between a BTS on which the EIM is installed and an RS configured to know the shared secret. The secret is used to authenticate the BTS to the mobile network (via the RS) and to authenticate the RS to the BTS, e.g., via a challenge and response, as described more fully below. In some embodiments, a uniform resource locator (URL) or other locator and/or address for the RS is programmed and/or otherwise embodied in the EIM. The URL or other locator and/or address is used in some embodiments to enable the BTS to authenticate itself to the network via a central RS and through contact with the RS to discover an address/locator for a servicing aggregation gateway (AGW) or other node, enabling the BTS (or other equipment) to automatically discover locator/address information for a servicing AGW (or other node). Such auto-discovery eliminates the need to provision the BTS or other equipment by configuring it with the locator/address for the AGW or other node, and lessens the burden associated with changing the locator/address for the AGW or other node, since the BTS or other equipment serviced by the AGW or other node would not have to be reconfigured and instead could auto-discover the new locator/address information from the RS. The preceding approach also allows the locator/address for the AGW and/or other node to be kept hidden from disclosure to the general public, reducing significantly the possibility that the AGW or other node will be subjected to a denial of service type of attack, e.g., via a packet-based or other public network used by the BTS to communicate with the AGW in some embodiments.

Figure 4:
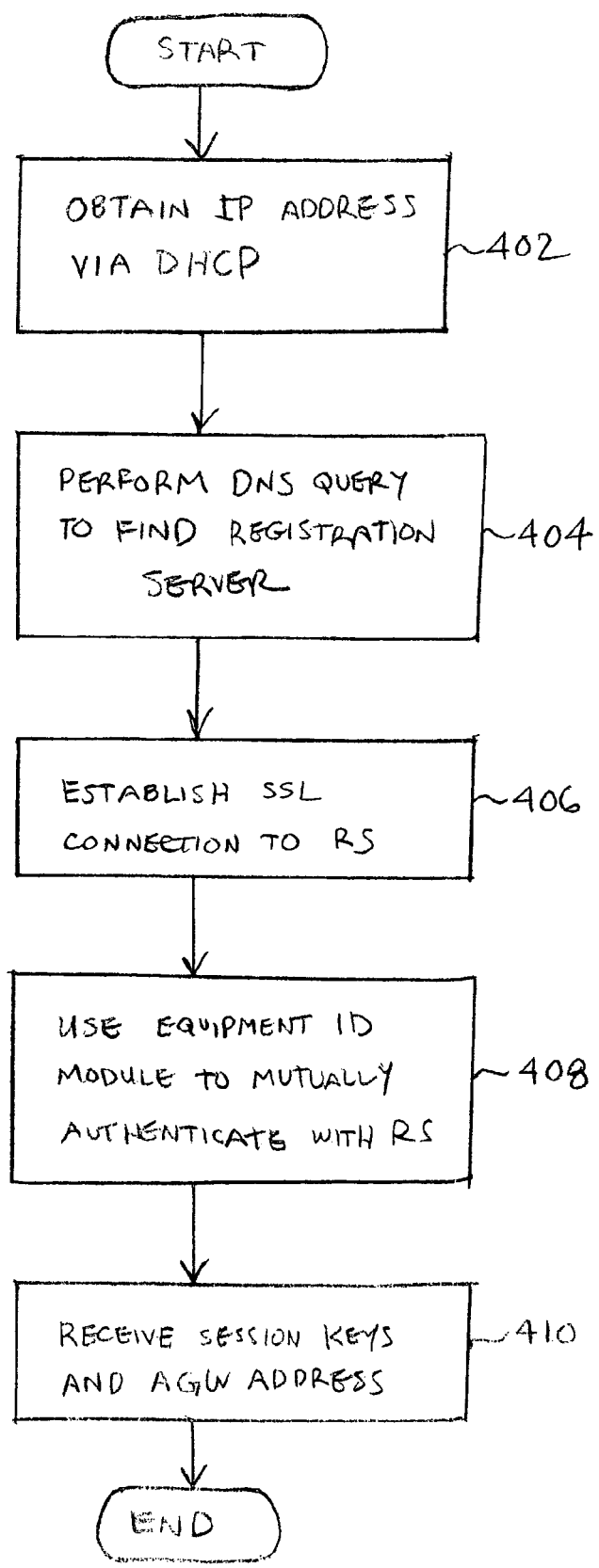
FIG. 4 is a flow chart illustrating an embodiment of a process for establishing a connection with a mobile network element, such as an aggregation gateway, via an IP or other packet data network.

FIG. 4 is a flow chart illustrating an embodiment of a process for establishing a connection with a mobile network element, such as an aggregation gateway, via an IP or other packet data network. In some embodiments, the process of FIG. 4 is implemented on a BTS such as BTS 304 and used, e.g., when the BTS first starts up, to establish communication with an aggregation gateway such as AGW 308. In the example shown, an IP address is obtained via DHCP (402) and a DNS query is sent to obtain an IP address for a registration (or other authentication) server (404). In some embodiments, the BTS is configured and/or provisioned to use a URL or other locator to obtain an IP address for the registration server. An SSL (or other secure) connection is established with the registration server (406), after which a shared secret, e.g., a key or other secret stored in a SIM, is used to mutually authenticate the BTS and the RS (408), as described more fully below in connection with FIGS. 5 and 6. Once the authentication has been completed, an IP address for the AGW and session keys needed to communicate securely with the AGW over the IP or other packet data network are received from the registration server (410). In some embodiments, voice data is sent between the BTS and the AGW using secure real-time transport protocol (S-RTP) via UDP over IP and signaling and/or other data are sent via SCTP over IP-SEC, and the keys received at (410) include keys needed to communicate securely using S-RTP, SCTP, and/or other protocols, as applicable.

In some embodiments, making the IP address of the RS but not that of the AGW publicly available (e.g., via a DNS query) protects the AGW against a denial of service or similar attack. In some embodiments, communication between a BTS and RS is infrequent (e.g., once a day), especially after initial BTS startup, and the nature of the communication between a BTS and RS is such that a relatively short term disruption of communication typically will not affect core network operations. By contrast, a successful denial of service attack on the AGW could disrupt the timely transmission and receipt of call data, thereby disrupting core services. In some embodiments, the RS and AGW are provided on the same physical system, and in some such embodiments, the physical system has a separate IP address for each.

Figure 5:
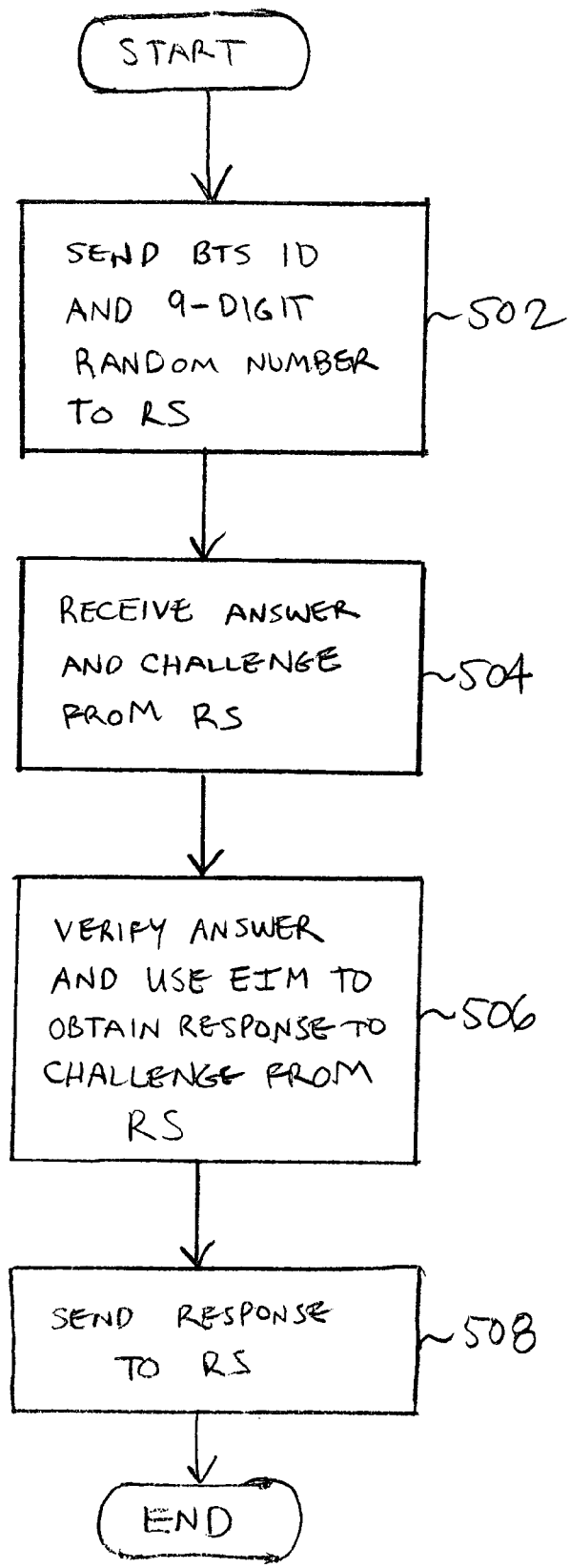
FIG. 5 is a flow chart illustrating an embodiment of a process for mutually authenticating a base transceiver station (BTS) and registration server (RS), from the perspective of the BTS.

FIG. 5 is a flow chart illustrating an embodiment of a process for mutually authenticating a base transceiver station (BTS) and registration server (RS), from the perspective of the BTS. In the example shown, the BTS sends an associated unique identifier (e.g., a "BTS ID") and a 9-digit (or other size) random number to the registration server (502). An answer and return challenge is received from the RS (504). The answer received from the RS is verified, e.g., by using the EIM to perform a prescribed computation using the 9-digit number sent to the registration server and the key or other secret held in/by the EIM, and the RS deemed trustworthy if the result matches the answer received from the RS, and a similar computation is performed using the number comprising the challenge received from the RS to obtain a response to send to the RS (506). A response message including the response computed at (506) (i.e., the result of the computation performed using the challenge number sent by the RS and the key/secret stored in/by the EIM) is sent to the RS (508).

Figure 6:
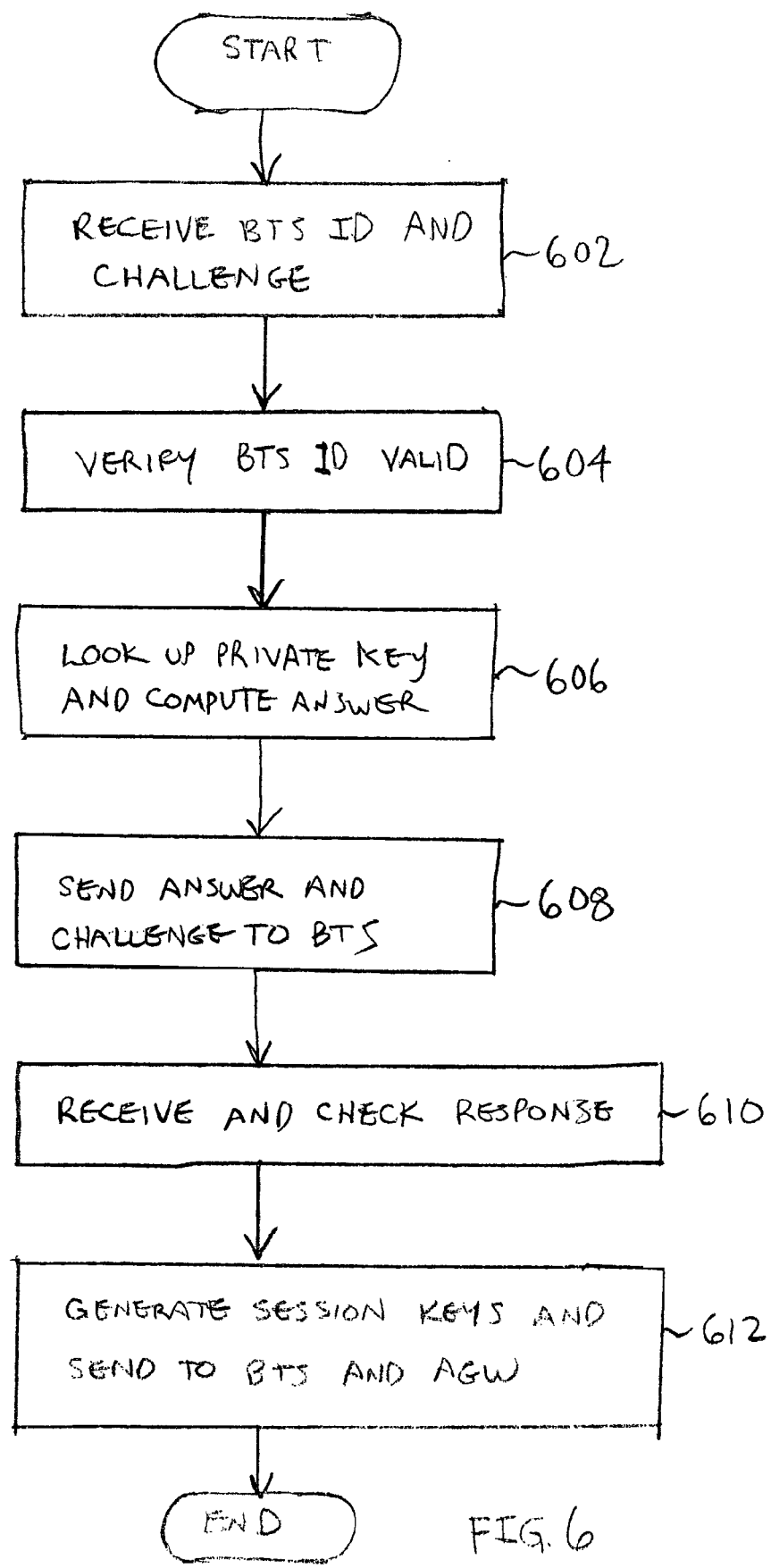
FIG. 6 is a flow chart illustrating an embodiment of a process for mutually authenticating a base transceiver station (BTS) and registration server (RS), from the perspective of the RS.

FIG. 6 is a flow chart illustrating an embodiment of a process for mutually authenticating a base transceiver station (BTS) and registration server (RS), from the perspective of the RS. A BTS identifier and challenge (e.g., 9-digit number) are received from a BTS (602). Mobile network records are checked to verify the BTS identifier is still valid/active (604), e.g., that it has not been stolen or its rights to connect otherwise terminated, e.g., for non-payment of bills. The BTS identifier is used to look up a shared secret, such as a key or other secret stored in/by an EIM installed at the BTS associated with the received BTS identifier, and the shared secret and the challenge number received from the BTS are used to compute an answer (606). The answer and a challenge (e.g., a random number) are sent to the BTS (608). A response is received from the BTS and the shared secret used to check the response by performing at the RS using the shared secret the computation the BTS is configured to perform using the EIM (610). If the computation performed at the RS yields the same result as the response received from the BTS, the BTS is considered authenticated and is trusted. Session keys are generated and sent to the BTS and the AGW (612), enabling secure communication over an IP and/or other packet data network between the BTS and the AGW. In some embodiments, as described above, (612) includes sending to the BTS an IP address for the AGW. In some embodiments, the keys provided by the RS have a prescribed and/or specified (e.g., by the RS) lifetime and the BTS must re-register, e.g., as described above, to obtain new keys once the lifetime of a current set of keys expires. In some embodiments, the session keys are generated at the RS dynamically, e.g., randomly, and sent to both the BTS and the AGW. In some embodiments, the keys are sent to the AGW via a private/secure connection, such as connection 311 of FIG. 3.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing a network address, comprising:
receiving, at a registration server from a base transceiver station, a communication indicating that the base transceiver station desires to communicate, via a packet data network, with a gateway configured to provide access for the base transceiver station to a base station controller, wherein
the gateway is communicatively disposed between the packet data network and the base station controller,
the registration server and the gateway are communicatively coupled to the packet data network,
the registration server and the gateway are communicatively coupled to each other over a secure connection that is separate from the packet data network; and
sending, from the registration server to the base transceiver station, a non-publicly advertised packet data network address usable to communicate with the gateway via the packet data network.

2. The method according to claim 1, wherein the communication comprises a unique identifier of the base transceiver station and a random number.

3. The method according to claim 2, further comprising:
selecting a key at the registration server using the unique identifier; and
computing an answer using the key and the random number that is sent to the base transceiver station.

4. The method according to claim 3, further comprising:
sending the answer and a second random number from the registration server to the base transceiver station.

5. The method according to claim 4, further comprising:
computing a response that is sent to the registration server by the base transceiver station using a second key stored in a smart card installed in the base transceiver station and the second random number.

6. The method according to claim 5, further comprising:
generating session keys by the registration server; sending the session keys to the base transceiver station over the packet data network and to the gateway over the secure connection that is separate from the packet data network, wherein the non-publicly advertised packet data network address is an IP address of the gateway; and
sending the IP address of the gateway by the registration server to the base transceiver station over the packet data network.

7. The method according to claim 6, further comprising:
securely communicating with the gateway by the base transceiver station using the session keys and the IP address of the gateway.

8. The method according to claim 7, further comprising:
securely communicating the base transceiver station and the gateway with the base station controller;
aggregating data at the gateway from a plurality of base transceiver stations;
communicating the aggregated data through a single physical port of the base station controller; and
presenting the plurality of base transceiver stations by the gateway as a single logical base transceiver station to the base station controller.

9. The method according to claim 7, wherein the session keys have a limited lifetime before the session keys expire.

10. The method according to claim 9, further comprising:
registering the plurality of base transceiver stations with the registration server to obtain new session keys.

11. The method according to claim 7, wherein the base transceiver station securely communicates voice data with the gateway using S-RTP via UDP over IP.

12. The method according to claim 11, further comprising:
securely communicating signaling or non-voice data between the base transceiver station and the gateway using SCTP over IP-SEC.

13. The method according to claim 6, further comprising:
sending the session keys by the registration server to the base transceiver station over the packet data network that is a public data network;
sending the session keys by the registration server to the gateway over a secure connection that is a private and direct connection between the registration server and the gateway;
communicatively disposing a firewall between the packet data network and the gateway;
communicatively disposing the firewall between the packet data network and the registration server; and
communicatively disposing the packet data network between the firewall and the plurality of base transceiver stations.

14. The method according to claim 1, wherein the packet data network comprises an IP network, and the non-publicly advertised packet data network address comprises an IP address of the gateway.

15. The method according to claim 1, further comprising:
receiving an indication that the non-publicly advertised packet data network address is no longer usable to access the gateway; and
auto-discovering a second non-publicly advertised packet data network address from the registration server.

16. The method according to claim 1, further comprising:
receiving an indication that the non-publicly advertised packet data network address is no longer usable to access the gateway;
receiving an indication that a second non-publicly advertised address is usable to access the base station controller; and
sending the second non-publicly advertised address to the base transceiver station.

17. The method according to claim 1, wherein the packet data network is the Internet, and further comprising:
communicating the base transceiver station with the base station controller through the Internet and the gateway; and
communicating the base transceiver station with the registration server without communicating with the gateway and without communicating with the base station controller.

18. The method according to claim 1, wherein an IP address of the registration server is publicly available via a DNS query, or wherein the base transceiver station is provisioned with a URL of the registration server upon an installation of a smart card on which the IP address resides, and wherein the smart card is configured to store a key that the registration server can look up using an identity of the base transceiver station.

19. The method according to claim 1, further comprising:
configuring the gateway to receive inbound mobile network data over the packet data network from a plurality of base transceiver stations, to aggregate the received inbound mobile network data, and to provide the aggregated inbound mobile network data to the base station controller using time division multiplexing over a single dedicated line; and
representing the aggregated inbound mobile network data as coming from a single logical base transceiver station.

20. The method according to claim 1, further comprising:
configuring the gateway to present a plurality of base transceiver stations to the base station controller as a single logical base transceiver station; and
configuring the gateway to interface with different types of base station controllers from different vendors.

21. The method according to claim 1, further comprising:
configuring the gateway to map first communications received from the base station controller to respective base transceiver stations and to map second communications received from a plurality of base transceiver stations to a single logical base transceiver station prior to forwarding the second communications to the base station controller.

22. The method according to claim 1, wherein the base transceiver station comprises a smart card device that stores a key and a unique identifier associated with the base transceiver station, and wherein the smart card performs cryptographic functions.

23. The method according to claim 1, further comprising:
installing a smart card in the base transceiver station;
provisioning the base transceiver station with a URL of the registration server and a key when a smart card is installed in the base transceiver station, wherein the smart card provisions the URL of the registration server and the key to the base transceiver station; and
looking up the key by the registration server based on an identity of the base transceiver station.

24. The method according to claim 23, further comprising:
upon initial installation of the smart card, requesting an IP address by the base station transceiver for itself;
using the URL of the registration server that is provisioned by the smart card to contact the registration server; and
the base transceiver station communicating with the registration server before being allowed to access the gateway and before being allowed to access the base station controller.

25. The method according to claim 1, wherein the gateway and the registration server have different IP addresses, the gateway and the registration server are in a same physical computing system, and the secure connection coupling the gateway and the registration server is a secure internal connection.

* * * * *